United States Patent [19]
Herd et al.

[11] Patent Number: 5,774,032
[45] Date of Patent: Jun. 30, 1998

[54] COOLING ARRANGEMENT FOR A SUPERCONDUCTING COIL

[75] Inventors: Kenneth Gordon Herd, Niskayuna; Evangelos Trifon Laskaris, Schenectady, both of N.Y.

[73] Assignee: General Electric Company, Schenectady, N.Y.

[21] Appl. No.: 702,879

[22] Filed: Aug. 23, 1996

[51] Int. Cl.$^6$ .............................. H02K 55/00; H02K 9/00; H01F 7/00
[52] U.S. Cl. ............................. 335/216; 310/52; 310/54; 310/261; 505/877; 505/878; 505/879
[58] Field of Search ................................ 310/52, 54, 201, 310/208, 261, 269; 335/216, 300, 301; 505/211, 876, 877, 878, 879, 880, 892, 893

[56] References Cited

U.S. PATENT DOCUMENTS

| | | | |
|---|---|---|---|
| 3,343,111 | 9/1967 | Kafka | 335/216 |
| 4,682,134 | 7/1987 | Laskaris | 335/216 |
| 5,325,080 | 6/1994 | Chandratilleke et al. | 335/216 |
| 5,381,122 | 1/1995 | Laskaris et al. | 335/216 |
| 5,404,122 | 4/1995 | Maeda et al. | 335/216 |
| 5,532,663 | 7/1996 | Herd et al. | 335/216 |

OTHER PUBLICATIONS

U.S. Patent Application Serial No. 08/267,625, filed Jun. 29, 1994, by Laskaris et al., entitled "Superconducting Rotor for an Electrical Machine". (To issue as U.S. Pat. 5,548,168 on Aug. 20, 1996).

U.S. Patent Application Serial No. 08/402,438, filed Mar. 13, 1995, by Herd et al., entitled "Superconducting Field Winding Assemblage For An Electrical Machine".

*Primary Examiner*—Michael L. Gellner
*Assistant Examiner*—Raymond Barrera
*Attorney, Agent, or Firm*—Douglas E. Erickson; Marvin Snyder

[57] ABSTRACT

A superconducting device, such as a superconducting rotor for a generator or motor. A vacuum enclosure has an interior wall surrounding a cavity containing a vacuum. A superconductive coil is placed in the cavity. A generally-annularly-arranged, thermally-conductive sheet has an inward-facing surface contacting generally the entire outward-facing surface of the superconductive coil. A generally-annularly-arranged coolant tube contains a cryogenic fluid and contacts a generally-circumferential portion of the outward-facing surface of the sheet. A generally-annularly-arranged, thermally-insulative coil overwrap generally circumferentially surrounds the sheet. The coolant tube and the inward-facing surface of the coil overwrap together contact generally the entire outward-facing surface of the sheet.

11 Claims, 3 Drawing Sheets

COOLING ARRANGEMENT FOR A SUPERCONDUCTING COIL

This invention was made with Government support under Government Contract No. DE-FC02-93CH10589 awarded by the Department of Energy. The Government has certain rights to this invention.

BACKGROUND OF THE INVENTION

The present invention relates generally to superconductivity, and more particularly to cooling a superconductive coil in a superconducting device.

Superconducting devices include, but are not limited to, superconducting rotors for synchronous electrical machines, such as generators and motors, and superconducting magnets for MRI (magnetic resonance imaging) machines, maglev (magnetic levitation) transportation systems, magnetic energy storage devices, and linear motors. The superconductive coil or coils in a superconducting device are made from a superconducting material, such as niobium-tin, requiring a temperature at or below a critical temperature to achieve and maintain superconductivity. Cooling techniques include cooling an epoxy-impregnated coil through a solid conduction path from a cryocooler or through cooling tubes containing a liquid and/or gaseous cryogen and cooling a porous coil (or even an epoxy-impregnated coil) by immersion in a liquid and/or gaseous cryogen. The superconductive coil is surrounded by a vacuum enclosure, and at least one thermal shield is added between the superconductive coil and the vacuum enclosure.

Known superconductor rotor designs include those having a racetrack-shaped superconductive coil which is in contact with an extruded heat station having an internal channel containing gaseous helium at a temperature of ten Kelvin. The superconductive coil is surrounded by a spaced-apart thermal shield which is cooled by contact with a coolant tube containing gaseous helium at a temperature of twenty Kelvin. The thermal shield is spaced-apart from and surrounded by a vacuum enclosure. What is needed is a superconducting device having an improved cooling arrangement for its superconductive coil or coils.

SUMMARY OF THE INVENTION

It is an object of the invention to provide a superconducting device cooled by a coolant tube containing a fluid cryogen.

The superconducting device of the invention includes a vacuum enclosure having an interior wall surrounding a generally-annular cavity containing a superconductive coil, a generally-annularly-arranged sheet of thermally conductive material, a generally-annularly-arranged coolant tube, and a generally-annularly-arranged coil overwrap. The inward-facing surface of the sheet contacts generally the entire outward-facing surface of the superconductive coil. The coolant tube contacts a generally-circumferential portion of the outward-facing surface of the sheet. The coil overwrap generally circumferentially surrounds the outward-facing surface of the sheet. The coolant tube and the inward-facing surface of the coil overwrap together contact generally the entire outward-facing surface of the sheet.

In a preferred embodiment, the vacuum occupies the entire cavity portion between the inward-facing surface of the superconductive coil and the interior wall. In an exemplary enablement, the two current leads of the superconductive coil are in thermal communication within the cavity of the vacuum enclosure with the exterior surface of the outlet end of the coolant tube.

Several benefits and advantages are derived from the invention. The coolant tube can be easily annularly arranged (such as by bending) while the previously-mentioned known heat station having a coolant channel cannot. Having the preferred vacuum completely occupying the cavity portion between the inward-facing surface of the superconductive coil and the interior wall eliminates the costly conventional thermal shield, especially for high-temperature superconductors. Having the two current leads in thermal communication with the exterior surface of the outlet end of the coolant tube enables ten-to-fifteen percent more electric current to flow into the superconductive coil for without quenching (i.e., loss of superconductivity) due to lead overheating.

BRIEF DESCRIPTION OF THE DRAWINGS

The accompanying drawings illustrate a preferred embodiment of the present invention wherein.

DETAILED DESCRIPTION OF THE INVENTION

Figure 1:
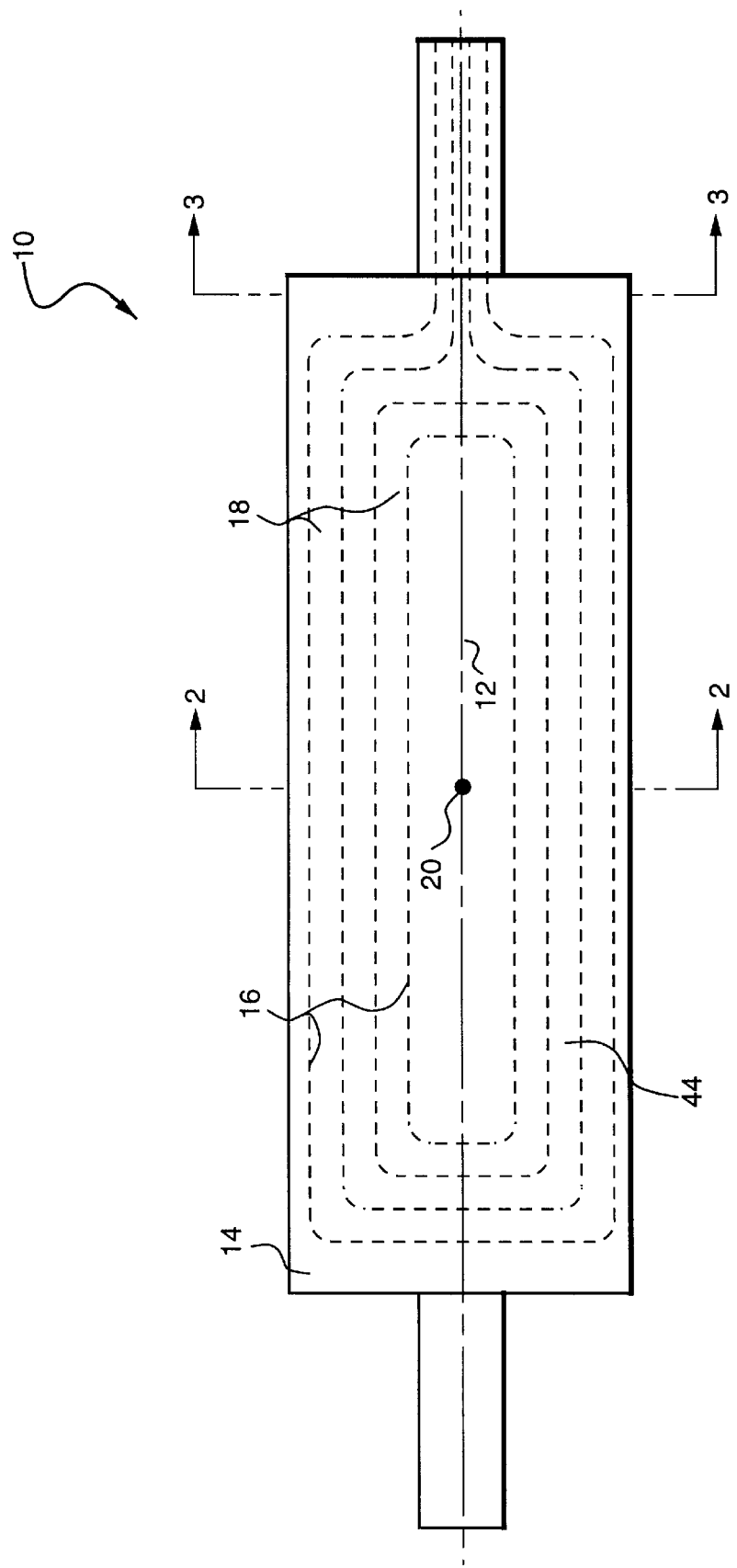
FIG. 1 is a schematic side elevational view of a first preferred embodiment of the superconducting device of the invention wherein the superconducting device is a superconducting rotor.
Figure 2:
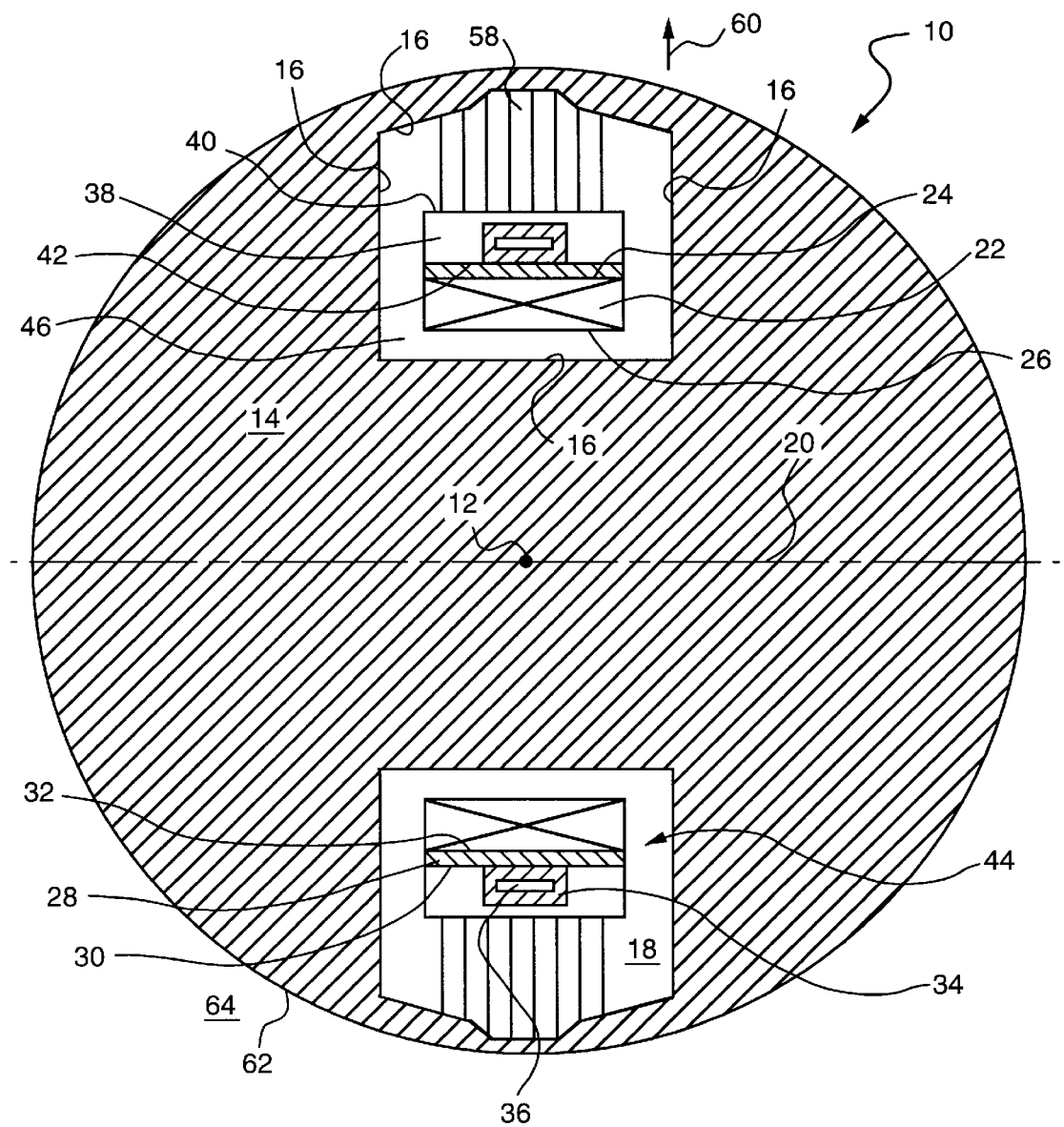
FIG. 2 is a schematic sectional view taken along lines 2—2 in FIG. 1 showing a preferred embodiment for cooling the superconductive coil.
Figure 3:
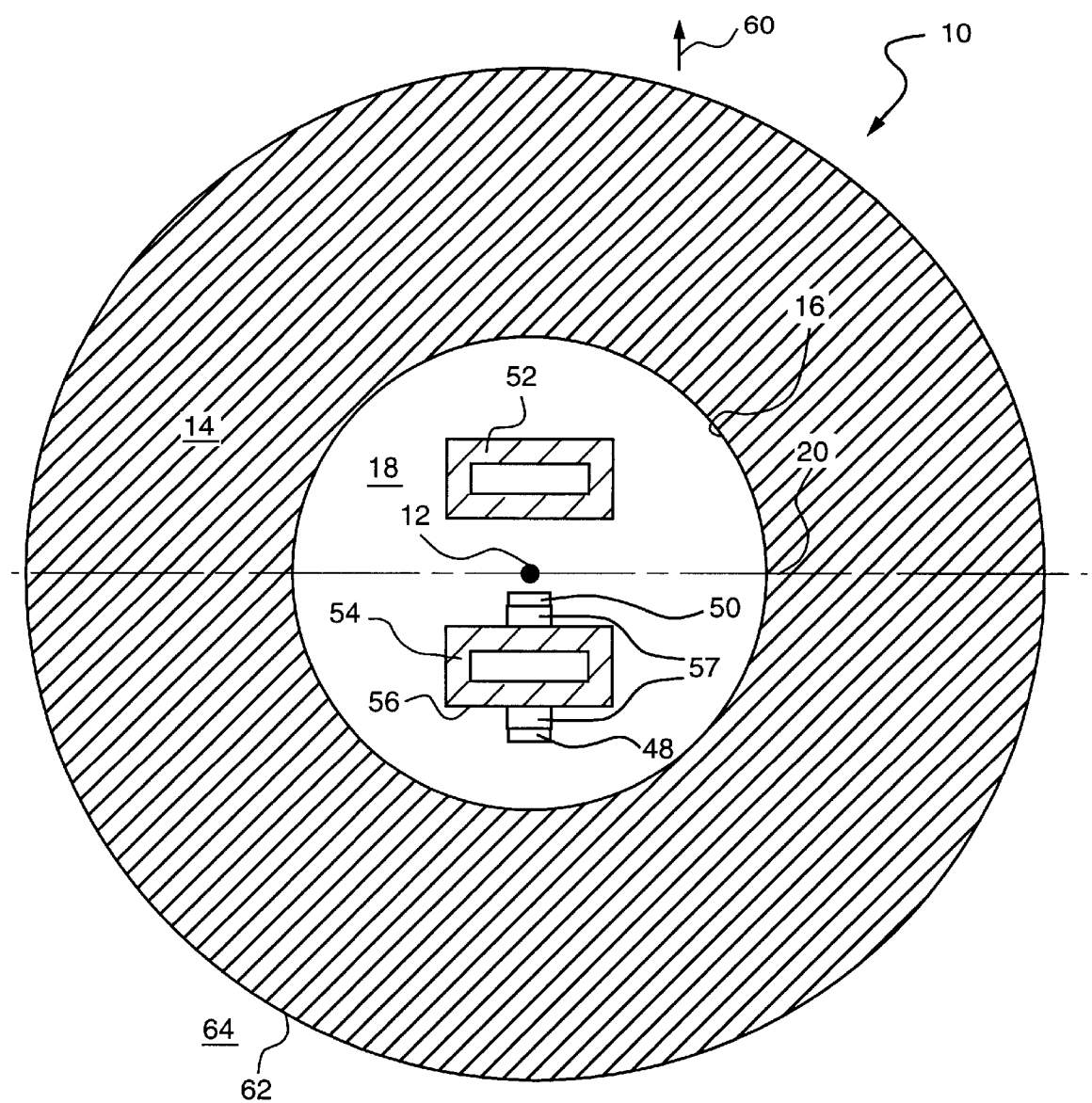
FIG. 3 is a schematic sectional view taken along lines 3—3 in FIG. 1 showing a preferred embodiment for also cooling the two current leads of the superconductive coil.

Referring now to the drawings, wherein like numerals represent like elements throughout, FIGS. 1–3 show a first preferred embodiment of the superconducting device of the present invention wherein the superconducting device is a superconducting rotor 10 having a rotational axis 12. It is pointed out that the superconducting device of the present invention is not limited to a rotor, but includes any superconducting device such as, but not limited to, superconducting magnets for MRI (magnetic resonance imaging) machines, maglev (magnetic levitation) transportation systems, magnetic energy storage devices, and linear motors. Preferably, the superconducting rotor 10 is for a synchronous electrical machine, such as a generator or a motor. It is noted that conventional generators and motors may be retrofitted to have their non-superconducting rotors replaced with the superconducting rotor 10 of the present invention.

The superconducting device (i.e., the superconducting rotor 10) shown in FIGS. 1–3 includes a vacuum enclosure 14 having an interior wall 16 surrounding a generally-annular cavity 18. The cavity 18 has a generally longitudinal axis 20 and contains a vacuum having a pressure not exceeding generally one-thousandth of a torr. The design of the vacuum enclosure 14 is left to the artisan. The vacuum enclosure 14 shown in FIGS. 2 and 3 has a monolithic vacuum-enclosure design. Other vacuum-enclosure designs include, without limitation, a vacuum enclosure (not shown in the figures) having an iron core including the straight portion of the interior wall 16 closest to the longitudinal axis 20, having an aluminum pole piece attached to the iron core and including the remaining portions of the interior wall 16, and having a surrounding aluminum electromagnetic shield, wherein the iron core, the aluminum pole piece, and the aluminum electromagnetic shield each may comprise several parts.

The superconducting rotor 10 also includes a superconductive coil 22 disposed within the cavity 18, generally coaxially aligned with the longitudinal axis 20, and generally spaced-apart from the interior wall 16. The superconductive coil 22 has a circumferential outward-facing surface 24 and a circumferential inward-facing surface 26. In an exemplary embodiment, the superconductive coil 22 is a racetrack-shaped superconductive coil, and the rotational axis 12 of the superconducting rotor 10 is aligned generally perpendicular to the longitudinal axis 20 of the cavity 18. It is noted that "racetrack-shape" includes straight sections connected by rounded corners. The superconducting rotor 10 shown in FIG. 2 is two-pole rotor. The superconducting device of the invention in the form of the superconducting rotor 10 of FIG. 2 is also applicable to other types of rotors such as multi-pole rotors (not shown in the figures) having a plurality of circumferentially spaced-apart racetrack-shaped superconductive coils whose longitudinal axes are disposed generally perpendicular to the rotational axis of the rotor. It is noted that the minor axis of each of the superconductive coils of a multi-pole rotor is disposed generally parallel to the circumferential direction of motion of the coil about the rotational axis while the minor axis of the superconductive coil 22 of the two-pole rotor 10 shown in FIG. 2 (or a similar-designed four-pole rotor) is disposed generally perpendicular to the circumferential direction of motion of the coil 22 about the rotational axis 12. Preferably, the superconductive coil 22 is a BSCCO (Bismuth-Strontium-Calcium-Copper-Oxide) superconductive coil.

The superconducting rotor 10 additionally includes a generally-annularly-arranged sheet 28 of thermally conductive material having a coefficient of thermal conductivity at least equal to that of copper at a temperature of generally 50 Kelvin. The sheet 28 is disposed within the cavity 18, is generally coaxially aligned with the longitudinal axis 20, and is generally spaced-apart from the interior wall 16. The sheet 28 may be a single-layer or a multi-layer sheet and has a thickness (along a direction perpendicular to the rotational axis 12 and the longitudinal axis 20) less than generally one-tenth the thickness (along a direction perpendicular to the rotational axis 12 and the longitudinal axis 20) of the superconductive coil 22. The sheet 28 has a circumferential outward-facing surface 30 and a circumferential inward-facing surface 32, wherein the inward-facing surface 32 of the sheet 28 contacts generally the entire outward-facing surface 24 of the superconductive coil 22. Preferably, the sheet 28 is an OFHC (oxygen-free-hard-copper) copper sheet.

The superconducting rotor 10 moreover includes a generally-annularly-arranged coolant tube 34 containing a cryogenic fluid 36 having a cryogenic temperature (i.e., a liquid and/or gas having a temperature low enough to make the superconductive coil 22 behave superconductively). The coolant tube 34 is disposed within the cavity 18, is generally coaxially aligned with the longitudinal axis 20, and is generally spaced-apart from the interior wall 16. The coolant tube 34 contacts a generally-circumferential portion of the outward-facing surface 30 of the sheet 28. Preferably, the coolant tube 34 is a stainless-steel coolant tube brazed to the sheet 28. In an exemplary enablement, the cryogenic fluid comprises gaseous helium at a temperature of between generally 15 Kelvin and generally 50 Kelvin.

The superconducting rotor 10 further includes a generally-annularly-arranged coil overwrap 38 of thermally insulative material having a coefficient of thermal conductivity no greater than that of fiberglass at a temperature of generally 50 Kelvin. The coil overwrap 38 is disposed within the cavity 18, is generally coaxially aligned with the longitudinal axis 20, and is generally spaced-apart from the interior wall 16. The coil overwrap 38 has a circumferential outward-facing surface 40 and a circumferential inward-facing surface 42. The coil overwrap 38 generally circumferentially surrounds the outward-facing surface 30 of the sheet 28. The coolant tube 34 and the inward-facing surface 42 of the coil overwrap 38 together contact generally the entire outward-facing surface 30 of the sheet 28. The coil overwrap 38 helps constrain the sheet 28 from lifting away from the outward-facing surface 24 of the superconductive coil 22 during rotation of the superconducting rotor 10. Preferably, the coil overwrap 38 is an epoxy-impregnated, many-layered, fiberglass-cloth coil overwrap (having a 0.003-to-0.005-inch individual layer thickness) which also completely covers the exposed portions of the coolant tube 34. It is noted that the copper sheet 28 may be treated with a conventional oxide inhibitor to improve bonding to the coil overwrap 38. In a favored construction, the copper sheet 28 is provided with a plurality of through holes (not shown in the figures) away from the area provided for the stainless-steel coolant tube 34 and is bent into a generally annular arrangement; the stainless-steel coolant tube 34 is bent into a generally annular arrangement and is brazed to the copper sheet 28; the copper sheet 28 is placed over the superconductive coil 22; fiberglass cloth is wrapped around the outward-facing surface 30 of the copper sheet 28 (as well as around the stainless-steel coolant tube 34) to form a generally-annularly-arranged coil overwrap 38; epoxy is directly applied to the accessible areas of the superconductive coil 22 and the wound fiberglass cloth with some of the epoxy from the fiberglass cloth reaching the superconductive coil 22 via the through holes in the sheet 28. Thus, it is seen that preferably the superconductive coil 22, the sheet 28, the coolant tube 34, and the coil overwrap 38 are epoxy impregnated together as a single rotor subassembly 44.

The cavity 18 has a cavity portion 46 extending between and to the inward-facing surface 26 of the superconductive coil 22 and the interior wall 16, and the vacuum occupies the entire cavity portion 46. Thus, there is no thermal shield between the superconductive coil 22 and the vacuum enclosure 14, especially for high temperature superconductors such as BSCCO. It is noted that a thermal shield possibly may be required for a lower temperature superconductor, such as $Nb_3Sn$ (niobium-tin).

As shown in FIG. 3, the superconductive coil 22 has two current leads 48 and 50, the coolant tube 34 has an inlet end 52 and an outlet end 54, and the outlet end 54 has an exterior surface 56. In an exemplary embodiment, the two current leads 48 and 50 of the superconductive coil 22 are in thermal communication, within the cavity 18 of the vacuum enclosure 14, with the exterior surface 56 of the outlet end 54 of the coolant tube 34. Since the current leads 48 and 50 are typically without electrical insulation, a block 57 of dielectric, but thermally conductive, material (such as beryllia) is abuttingly interposed between the outlet end 54 of the coolant tube 34 and the two current leads 48 and 50.

The rotor subassembly 44 (i.e., the epoxied-together superconductive coil 22, the sheet 28, the coolant tube 34, and the coil overwrap 38) is positioned within the cavity 18 spaced-apart from the interior wall 16 by positioning apparatus. Preferably, such positioning apparatus is a honeycomb assemblage 58 having a coefficient of thermal conductivity generally not exceeding that of fiberglass at a temperature of generally fifty Kelvin. It is preferred that the honeycomb assemblage 58 include a plurality of generally identical cells having a common open direction 60 which is perpendicular to both the rotational axis 12 and the longitudinal axis 20. In an exemplary enablement, the honeycomb assemblage 58 is a filamentary-reinforced-epoxy (FRE) composite honeycomb structure whose distance between opposing sides of a cell ranges between generally one millimeter and generally one centimeter. In an exemplary design, the honeycomb assemblage 58 extends between and to the outward-facing surface 40 of the coil overwrap 38 and the interior wall 16 of the vacuum enclosure 14. Preferably, the honeycomb assemblage 58 comprises spaced-apart honeycomb blocks.

It is noted that the vacuum enclosure 14 has an outer surface 62 in contact with ambient air 64 at ambient temperature. Such ambient temperature will increase during operation of the superconducting rotor 10, as can be appreciated by the artisan. The honeycomb assemblage 58 provides means for compressing, at the ambient temperature, the superconductive coil 22 inward toward the longitudinal axis 20 with a first compressive force and for compressing, at the cryogenic temperature, the superconductive coil 22 inward toward the longitudinal axis 20 with a second compressive force which is smaller than the first compressive force. Other positioning apparatus and/or compressing means includes springs, tightening bolts, and the like, as is known to those skilled in the art. A preferred method (not shown in the figures) of compressing the superconductive coil 22 using the honeycomb assemblage 58 involves using a clamp fixture during rotor assembly. The clamp fixture (which can easily be obtained or made by the artisan) uses bolts to tighten down a bar on the superconductive coil 22 compressing it. Then, the non-compressed honeycomb assemblage 58 is positioned within the cavity 18. Next, the bolts are removed through holes in the vacuum enclosure 14, such holes later being covered (such as with a surrounding aluminum electromagnetic shield). The removal of the bolts causes the superconductive coil 22 to expand slightly causing the coil overwrap 38 to push against the honeycomb assemblage 58 such that the honeycomb assemblage 58 holds the superconductive coil 22 in compression. The compression is less at colder (e.g., cryogenic) temperatures, because of differing coefficients of thermal contraction for the previously-listed preferred materials making up the various components of the superconducting rotor 10, as can be appreciated by the artisan. It is noted that the non-compressed honeycomb assemblage 58 may be coated with a conventional two-part cryogenic epoxy before being positioned within the cavity 18 if expected shear forces would require such epoxy bonding between the honeycomb assemblage 58 and the interior wall 16 of the vacuum enclosure 14 and/or between the honeycomb assemblage 58 and the outward-facing surface 40 of the coil overwrap 38.

In operation, heat conducting along the positioning apparatus (e.g., honeycomb assemblage 58) from the warm outer surface 62 of the vacuum enclosure 14 is intercepted at the copper sheet 28 (which acts as a heat exchanger) before the heat reaches the superconductive coil 22, and the heat is conducted along the copper sheet 28 to the coolant tube 34. Heat that is radiated directly to the superconductive coil 22 or is generated by resistive losses within the superconductive coil 22 is conducted to the copper sheet 28 where it is efficiently conducted to the coolant tube 34. Since the superconductive coil 22 has a low thermal conductivity in the transverse directions (i.e., in directions other than along the conductor), the copper sheet 28 serves as a low resistance path for heat to conduct from the outer surface of the superconductive coil 22 to the coolant tube 34, thereby minimizing the temperature gradients within the superconductive coil 22. The use of copper for the sheet 28 allows it to be bent to conform to the outer surface 24 of the superconductive coil 22. The use of stainless steel for the coolant tube 34 allows it to be bent and welded together to conform to the generally-annularly-arranged sheet 28. The use of fiberglass cloth in the coil overwrap 38 allows it to easily conform to the exposed surfaces of the copper sheet 28 and the stainless-steel coolant tube 34 during "dry" winding, and the use of epoxy to impregnate the wound fiberglass cloth forms a robust mechanical coil overwrap 38. Keeping the superconductive coil 22 in compression with the honeycomb assemblage 58 maintains the spaced-apart positioning of the superconductive coil 22 within the cavity 18. Thermally connecting the two current leads 48 and 50 to the outlet end 54 of the coolant tube 34 allows the use of a higher ramping current without excessive heating.

The foregoing description of a preferred embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

We claim:

1. A superconducting device comprising:
    a) a vacuum enclosure having an interior wall surrounding a generally-annular cavity, wherein said cavity has a generally longitudinal axis, and wherein said cavity contains a vacuum having a pressure not exceeding generally one-thousandth of a torr;
    b) a superconductive coil disposed within said cavity, generally coaxially aligned with said longitudinal axis, generally spaced-apart from said interior wall, having a circumferential outward-facing surface, and having a circumferential inward-facing surface;
    c) a generally-annularly-arranged sheet of thermally conductive material having a coefficient of thermal conductivity at least equal to that of copper at a temperature of generally 50 Kelvin, disposed within said cavity, generally coaxially aligned with said longitudinal axis, generally spaced-apart from said interior wall, having a circumferential outward-facing surface, and having a circumferential inward-facing surface, wherein the inward-facing surface of said sheet contacts generally the entire outward-facing surface of said superconductive coil;
    d) a generally-annularly-arranged coolant tube containing a cryogenic fluid having a cryogenic temperature, disposed within said cavity, generally coaxially aligned with said longitudinal axis, and generally spaced-apart from said interior wall, wherein said coolant tube contacts a generally-circumferential portion of the outward-facing surface of said sheet; and
    e) a generally-annularly-arranged coil overwrap of thermally insulative material having a coefficient of thermal conductivity no greater than that of fiberglass at a temperature of generally 50 Kelvin, disposed within said cavity, generally coaxially aligned with said longitudinal axis, generally spaced-apart from said interior wall, having a circumferential outward-facing surface, and having a circumferential inward-facing surface, wherein said coil overwrap generally circumferentially surrounds the outward-facing surface of said sheet, wherein said coolant tube and the inward-facing surface of said coil overwrap together contact generally the entire outward-facing surface of said sheet, and wherein said superconductive coil, said sheet, and said coil overwrap are disposed completely outside said coolant tube.

2. The superconducting device of claim 1, wherein said superconductive coil has two current leads, wherein said coolant tube has an inlet end and an outlet end, wherein said outlet end has an exterior surface, and wherein said two current leads of said superconductive coil are in thermal communication, within said cavity of said vacuum enclosure, with said exterior surface of said outlet end of said coolant tube.

3. The superconducting device of claim 1, wherein said cavity has a cavity portion extending between and to the inward-facing surface of said superconductive coil and said interior wall, and wherein said vacuum occupies the entire cavity portion.

4. The superconducting device of claim 1, wherein said vacuum enclosure has an outer surface in contact with ambient air at ambient temperature.

5. The superconducting device of claim 4, also including means for compressing, at said ambient temperature, said superconductive coil inward toward said longitudinal axis with a first compressive force.

6. The superconducting device of claim 5, wherein said compressing means compresses, at said cryogenic temperature, said superconductive coil inward toward said longitudinal axis with a second compressive force which is smaller than said first compressive force.

7. The superconducting device of claim 6, wherein said superconductive coil is a racetrack-shaped superconductive coil, and wherein said superconducting device is a superconducting rotor having a rotational axis aligned generally perpendicular to said longitudinal axis of said cavity.

8. The superconducting device of claim 7, wherein said cryogenic fluid comprises gaseous helium.

9. The superconducting device of claim 8, wherein said superconductive coil is a BSCCO (Bismuth-Strontium-Calcium-Copper-Oxide) superconductive coil, wherein said sheet is an OFHC (oxygen-free-hard-copper) copper sheet, wherein said coolant tube is a stainless-steel coolant tube, and wherein said coil overwrap is an epoxy-impregnated, fiberglass-cloth coil overwrap.

10. The superconducting device of claim 9, wherein said cavity has a cavity portion extending between and to the inward-facing surface of said superconductive coil and said interior wall, and wherein said vacuum occupies the entire cavity portion.

11. The superconducting device of claim 10, wherein said superconductive coil has two current leads, wherein said coolant tube has an inlet end and an outlet end, wherein said outlet end has an exterior surface, and wherein said two current leads of said superconductive coil are in thermal communication, within said cavity of said vacuum enclosure, with said exterior surface of said outlet end of said coolant tube.

* * * * *